Dec. 25, 1956  D. W. PEACEMAN  2,775,125
MASS FLOW METER
Filed July 16, 1954

DONALD W. PEACEMAN
INVENTOR.

BY
ATTORNEY.

United States Patent Office 2,775,125
Patented Dec. 25, 1956

2,775,125

MASS FLOW METER

Donald W. Peaceman, Houston, Tex., assignor, by mesne assignments, to Esso Research and Engineering Company, Elizabeth, N. J., a corporation of Delaware Application July 16, 1954, Serial No. 443,782

5 Claims. (Cl. 73—194)

The present invention is directed to a mass flow meter. More particularly, the invention is directed to a flow meter which will determine the mass rate of flow independent of variations in density. In its more specific aspects, the device is directed to a flow meter suitable for use in determining the flow rate of hydrocarbons in a liquid or gaseous state or in mixtures of liquids and gases.

The present invention may be briefly described as a device for measuring mass rate of flow of fluid which comprises a vaned impeller arranged in a housing which has a driving shaft; a passageway is provided for introducing fluids between the vanes of the impeller. Rotatably mounted in the housing, for rotation independently of the rotation of the shaft, is a vaned element. An indicating shaft which is restrained from rotation by a spring is connected to the vaned element for rotation with the vaned element. Attached to the indicating shaft is an indicating means, such as a pointer, which indicates variations in flow rate of fluids, introduced through the passageways, on a graduated dial. An outer housing surrounds the vaned casing and is provided with an outlet for the fluids introduced into the vaned casing.

The driving shaft is provided with power or motivating means, such as an electric motor, operatively connected to the shaft for rotating the shaft at a constant speed.

An enclosing member is mounted on the housing surrounding the vaned element which encloses a free end of the indicating shaft. The restraining coil spring embraces the free end of the indicating shaft and is connected thereto and to the member enclosing the free end of the indicating shaft.

The present invention will be further illustrated by reference to the drawing in which.

Figure 1:
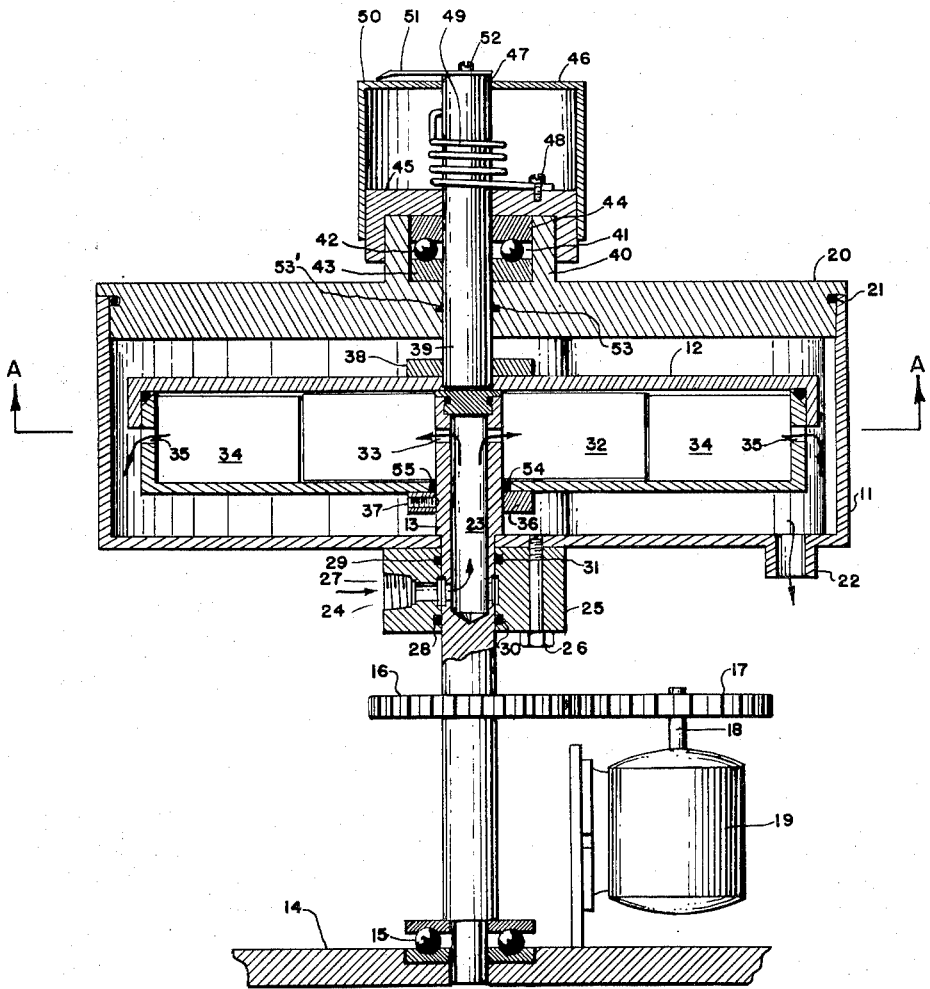
Fig. 1 shows a partial sectional view of a preferred embodiment.
Figure 2:
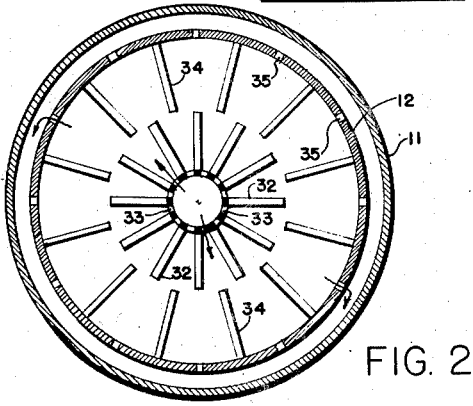
Fig. 2 is a sectional view taken along the lines A—A of Fig. 1.

Referring now to the drawing, and specifically to Figs. 1 and 2, numeral 11 designates an outer housing enclosing an inner vaned casing 12 which is rotatably mounted on a drive shaft 13. The driving shaft 13 is designed to rotate in a bearing means 14 provided with bearings 15 and carries a gear 16 which meshes with gear 17. The gears 16 and 17 form a gear train. The gear 17 is mounted on a driving shaft 18 which is driven at a constant speed by a suitable motivating or power means such as an electric motor 19.

The outer housing 11 has a cover plate 20 which is sealed against leakage by a suitable sealing means 21, such as an O-ring. The outer housing 11 is also provided with an outlet conduit 22 for release of fluids introduced in a manner which will be described further.

The drive shaft 13 defines a longitudinal passageway 23 which communicates with a fluid inlet 24 in an inlet housing 25 which is connected to the housing 11 by means of threaded bolts 26. The inlet 24 is provided with suitable threads, such as 27, for connection to a pipe or conduit and the like.

The inlet housing 25 is provided with recesses 28 and 29 in which are arranged, respectively, sealing means, such as O-rings 30 and 31, to form a seal against the drive shaft 13. The drive shaft 13 is provided with impeller vanes 32 between which fluid is introduced through ports 33 from the passageway 23.

The vaned casing 12 encloses the impeller vanes 32 and is provided with vanes 34 which are shown more clearly in Fig. 2. The vaned casing is also provided with a plurality of outlet ports 35 for discharge of fluid introduced into the vaned casing through ports 33. Ports 35 serve to allow fluid to be discharged from the housing 11 through outlet 22. The vaned casing 12 is held in position on the shaft 13 for rotation independent thereof by means of a collar 36 attached to the shaft 13 by a set screw 37.

Connected to the vaned casing 12 by an annular member 38 is an indicating shaft 39 which passes through the cover 20 of the housing 11. Arranged between an annular upthrusting member 40, connected to the cover 20, are bearings 41 for rotation of the shaft 39. These bearings are arranged in a bearing raceway 42 defined by the annular members 43 and 44, these members being held in the upthrusting annular member 40 by means of a cover plate 45.

Connected to the cover plate 45 and forming part thereof is a housing or enclosing member 46 which encloses a free end 47 of the indicating shaft 39. Connected to the member 45 by means of a screw 48 and to the shaft 39 is a restraining coil spring 49.

The upper exterior surfaces of the housing 46 is graduated to form a dial 50. Connected to the free end 47 of the indicating shaft 39 is a pointer 51 which is secured thereto by a set screw 52.

It is to be noted that the indicating shaft passes through the cover 20 and is sealed against leakage by means of a sealing member, such as an O-ring 53, arranged in a recess 53'. Likewise, it is to be noted that the vaned casing 12 is provided with a sealing member, such as an O-ring 54 arranged in recess 55.

The present invention operates in the following manner with respect to Figs. 1 and 2:

Fluid is introduced into the impeller shaft 13 by way of inlet 24 into passageway 23 and flows out between the vanes 32 by means of ports 33. The impeller shaft is driven at a constant rate of speed by the electric motor 19 through the gears 16 and 17. The fluid flows between the vanes 32 and against the vanes 34 in the casing 12 which is free to rotate on the shaft 13 against the resistance of the restraining spring 49. From the inner casing 12 the fluid flows into the housing 11 and outward therefrom through outlet 22.

A force proportional to the mass rate of flow of the fluid acts on the vanes 34 causing the shaft 39, which is attached to the housing 12, to turn and exert a force on the spring 49 which is attached to the shaft 39 and to the fixed member 45. The deflection of shaft 39 is shown by the pointer 51 on the graduated dial 50 on the fixed housing 46.

Thus if F is the force causing deflection, W the angular velocity of the impeller, $r$ the outer radius of the vanes 32 and $$\frac{dm}{dt}$$

the mass rate of flow, then $$F = Wr\left(\frac{dm}{dt}\right)$$

which allows determination of the mass rate of flow.

The device of the present invention is advantageous and has considerable utility in that the range over which the flow rate may be measured may be changed easily by varying the rate of rotation of the impeller, such as by varying the ratio in the gear train. Thus at a given speed the device is calibrated by running at zero flow rate with the instruments filled with the fluid to be measured and setting the dial at zero. Any deflection of subsequent flow of fluid is proportional to the force as computed in the above formula.

The outer radius of the impeller vanes may range from about 1 inch to about 15 inches with satisfactory results obtained with impeller vanes having a radius of about 4 inches. Where mixtures of crude oil and natural gas are flowed through the device, the outer radius of the impeller vanes may be about 6 inches.

Fluids having densities in the range from that of natural gas to that of water may be successfully measured by the present device.

The speed of the driving shaft may vary with the density of the fluid and the velocity of flow. A rotational speed in the range from about 300 to about 3000 revolutions a minute may be satisfactory.

As a specific example of the present invention, a mixture of crude oil having a density of 55 pounds per cubic foot and natural gas having a density of 0.04 pound per cubic foot may be flowed through the instrument as has been described with the shaft rotating at about 1800 revolutions per minute. If the density of the admixture should change by increasing amounts of dissolved gas, the mass rate of flow is obtainable since the present invention operates independently of the density of the fluid passing through it.

The present invention has application and use in determining the flow of crude petroleum, fractions thereof, hydrocarbon gases and liquids, aqueous fluids, suspensions both liquid and gaseous, and many other applications which will occur readily to the skilled workman.

The nature and objects of the present invention having been completely described and illustrated, what I wish to claim as new and useful and to secure by Letters Patent is:

1. In a device for measuring mass rate of flow of fluids which comprises, in combination, an impeller provided with vanes, a driving shaft connected with said impeller provided with a passageway for introducing fluids radially between the vanes of said impeller, the vanes of said impeller extending outwardly from the periphery of the driving shaft, a casing provided with vanes extending inwardly from the periphery thereof rotatably mounted on said driving shaft to enclose said impeller and for rotation independently of the rotation of the driving shaft around the vanes of the impeller, said casing being provided with peripheral ports for discharge of fluid from between the vanes of the casing, an indicating shaft connected to said vaned casing for rotation with the vaned casing, resilient means connected to said indicating shaft for restraining said indicating shaft and casing, and indicating means attached to the indicating shaft for indicating variations in flow rate of fluids introduced through said passageway between the vanes of said impeller and discharging into said casing between the vanes of the casing.

2. A device for measuring mass rate of flow of fluids which comprises, in combination, an impeller provided with vanes, a driving shaft connected with said impeller provided with a passageway for introducing fluids radially between the vanes of said impeller, the vanes of said impeller extending outwardly from the periphery of the driving shaft, motivating means connected to said driving shaft for driving said driving shaft, a casing provided with vanes extending inwardly from the periphery thereof rotatably mounted on said driving shaft to enclose said impeller and for rotation independently of the rotation of the driving shaft around the vanes of the impeller, said casing being provided with peripheral ports between the vanes of the casing for discharge of fluid, an indicating shaft connected to said vaned casing for rotation with the vaned casing, resilient restraining means connected to said indicating shaft, and indicating means attached to the indicating shaft for indicating variations in flow rate of fluids introduced through said passageway between the vanes of said impeller and discharging into said casing between the vanes of the casing.

3. A device for measuring mass rate of flow of fluids which comprises, in combination, an impeller provided with vanes, a driving shaft connected with said impeller provided with a passageway for introducing fluids radially between the vanes of said impeller, the vanes of the impeller extending outwardly from the periphery of the driving shaft, motivating means connected to said driving shaft for driving said driving shaft, a casing provided with vanes extending inwardly from the periphery thereof rotatably mounted on said driving shaft to enclose said impeller and for rotation independently of the rotation of the driving shaft around the vanes of the impeller, said casing being provided with peripheral ports between the vanes of the casing for discharge of fluid, an indicating shaft connected to said vaned casing for rotation with the vaned casing, a restraining spring connected to said indicating shaft, indicating means attached to the indicating shaft for indicating variations in flow rate of fluids introduced through said passageway between vanes of said impeller and discharging into said casing between the vanes of the casing, and an outer housing surrounding said vaned casing provided with an outlet for said fluids.

4. A device for measuring mass rate of flow of fluids which comprises, in combination, an impeller provided with vanes, a driving shaft connected with said impeller provided with a passageway for introducing fluids radially between the vanes of said impeller, the vanes of the impeller extending outwardly from the periphery of the driving shaft, power means connected to said driving shaft for driving said driving shaft, a casing provided with vanes extending inwardly from the periphery thereof rotatably mounted on said driving shaft to enclose said impeller and for rotation independently of the rotation of the driving shaft around the vanes of the impeller, an outer housing surrounding said vaned casing provided with an outlet for fluids introduced into said vaned casing, said casing being provided with peripheral ports between the vanes of the casing for discharge of fluid into said housing, an indicating shaft connected to said vaned casing for rotation with the vaned casing, a restraining spring connected to said indicating shaft and to said outer housing, and indicating means comprising a pointer attached to the indicating shaft and a graduated dial for indicating variations in flow rate of fluids introduced through said passageway between the vanes of said impeller and discharging into said casing between the vanes of the casing.

5. A device for measuring mass rate of flow of fluids which comprises, in combination, an impeller provided with vanes, a hollow driving shaft connected with said impeller, said hollow driving shaft having an inlet and providing a passageway for introducing fluids radially between the vanes of said impeller through peripheral ports in said hollow driving shaft, the vanes of the impeller extending outwardly from the periphery of the driving shaft, a motor operatively connected to said driving shaft for rotating said driving shaft, a casing provided with vanes extending inwardly from the periphery thereof rotatably mounted on said driving shaft to enclose said impeller and for rotation independently of the rotation of the driving shaft around the vanes of the impeller, said casing being provided with peripheral ports between the vanes of the casing for discharge of fluid, an outer housing surrounding said vaned casing provided with an outlet for fluids introduced into said vaned casing and discharged into the housing through said ports, an indicating shaft connected to said vaned casing for rotation with the vaned casing, a housing mounted on said outer housing enclosing a free end of said indicating shaft, a restraining coil spring embracing the free end of said indicating shaft connected to said indicating shaft and to the housing enclosing the free end of said indicating shaft, and indicating means comprising a pointer attached to the indicating shaft and a graduated dial for indicating variations in flow rate of fluids introduced through said passageway between the vanes of said impeller and discharging into said casing between the vanes of the casing.

References Cited in the file of this patent

UNITED STATES PATENTS

| | | |
|---|---|---|
| 735,901 | Peterson | Aug. 11, 1903 |
| 1,382,604 | Carson | June 21, 1921 |
| 2,602,330 | Kollsman | July 8, 1952 |
| 2,714,310 | Jennings | Aug. 2, 1955 |
| 2,721,478 | Somerville | Oct. 25, 1955 |

OTHER REFERENCES

Article: Mass Flow Rate Indicator, page 348 of Instruments, vol. 26, March 1953.

Article: Mass Flowmeter, pages 900 and 901 of Mechanical Engineering, vol. 75, November 1953.